(12) United States Patent
Nakamura

(10) Patent No.: US 11,545,925 B2
(45) Date of Patent: Jan. 3, 2023

(54) ROTARY ELECTRIC MACHINE CONTROL DEVICE AND ELECTRIC POWER STEERING DEVICE USING SAME

(71) Applicant: DENSO CORPORATION, Kariya (JP)

(72) Inventor: Koichi Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 662 days.

(21) Appl. No.: 16/534,102

(22) Filed: Aug. 7, 2019

(65) Prior Publication Data

US 2019/0363664 A1    Nov. 28, 2019

Related U.S. Application Data

(63) Continuation of application No. PCT/JP2018/004523, filed on Feb. 9, 2018.

(30) Foreign Application Priority Data

Feb. 10, 2017    (JP) .............................. JP2017-023439

(51) Int. Cl.
*H02P 29/024* (2016.01)
*B62D 5/04* (2006.01)
*H02P 27/06* (2006.01)

(52) U.S. Cl.
CPC .......... *H02P 29/024* (2013.01); *B62D 5/0412* (2013.01); *B62D 5/0463* (2013.01); *H02P 27/06* (2013.01)

(58) Field of Classification Search
CPC .. H02P 6/28; H02P 29/032; H02P 6/12; H02P 25/22; H02P 29/68; B62D 5/046; B62D 5/0487; B62D 5/04; H02K 11/33; H02K 9/22; H02K 11/02; H01L 23/367
See application file for complete search history.

(56) References Cited

U.S. PATENT DOCUMENTS

2017/0217481 A1    8/2017    Asao et al.
2018/0208236 A1*   7/2018    Asao ................... H02P 29/0241
2019/0023315 A1*   1/2019    Takizawa ............. B62D 5/0484

FOREIGN PATENT DOCUMENTS

| JP | H10-229695 A | 8/1998 |
| JP | 2011-195089 A | 6/2011 |
| JP | 2015-074403 A | 4/2015 |
| WO | 2016/063367 A1 | 4/2016 |

* cited by examiner

*Primary Examiner* — Said Bouziane
(74) *Attorney, Agent, or Firm* — Maschoff Brennan

(57) ABSTRACT

A rotary electric machine control device for controlling a rotary electric machine having multiple winding sets includes multiple inverter circuits, multiple power supply relays, and multiple controllers provided for respective systems. Each of the controllers is configured to monitor an abnormality of a subject system and an abnormality of a different system and is configured to turn off a power supply relay in the subject system when an abnormality requiring a power supply stop occurs in the subject system. Each of the controllers is further configured to acquire power supply relay information related to a state of the power supply relay of the different system through a signal line, and is configured to monitor the abnormality of the different system based on the power supply relay information.

13 Claims, 11 Drawing Sheets

FIG. 3

| UPDATE COUNTER | CURRENT DETECTION VALUE | CURRENT COMMAND VALUE | CURRENT LIMIT VALUE | STATUS | CRC |

FIG. 4A

| UPDATE COUNTER | CURRENT DETECTION VALUE | CURRENT COMMAND VALUE | STATUS | CRC |

FIG. 4B

| UPDATE COUNTER | CURRENT DETECTION VALUE | CURRENT LIMIT VALUE | STATUS | CRC |

FIG. 5A

| UPDATE COUNTER | CURRENT DETECTION VALUE | CURRENT COMMAND VALUE | CURRENT LIMIT VALUE | STATUS | CRC |
|---|---|---|---|---|---|

FIG. 5B

| UPDATE COUNTER | CURRENT DETECTION VALUE | CURRENT COMMAND VALUE | CURRENT LIMIT VALUE | STEERING TORQUE VALUE | STATUS | CRC |
|---|---|---|---|---|---|---|

FIG. 5C

| UPDATE COUNTER | CURRENT DETECTION VALUE | CURRENT COMMAND VALUE | STEERING TORQUE VALUE | STATUS | CRC |
|---|---|---|---|---|---|

ROTARY ELECTRIC MACHINE CONTROL DEVICE AND ELECTRIC POWER STEERING DEVICE USING SAME

CROSS REFERENCE TO RELATED APPLICATIONS

The present application is a continuation application of International Patent Application No. PCT/JP2018/004523 filed on Feb. 9, 2018, which designated the U.S. and claims the benefit of priority from Japanese Patent Application No. 2017-23439 filed on Feb. 10, 2017. The entire disclosures of all of the above applications are incorporated herein by reference.

TECHNICAL FIELD

The present disclosure relates to a rotary electric machine control device and an electric power steering device using the rotary electric machine control device.

BACKGROUND

Conventionally, a rotary electric machine control device capable of determining an abnormality has been known.

SUMMARY

The present disclosure provides a rotary electric machine control device for controlling a rotary electric machine having multiple winding sets. The rotary electric machine control device includes multiple inverter circuits, multiple power supply relays, and multiple controllers provided for respective systems. Each of the controllers is configured to monitor an abnormality of a subject system and an abnormality of a different system and is configured to turn off a power supply relay in the subject system when an abnormality requiring a power supply stop occurs in the subject system. Each of the controllers is further configured to acquire power supply relay information related to a state of the power supply relay of the different system through a signal line, and is configured to monitor the abnormality of the different system based on the power supply relay information.

BRIEF DESCRIPTION OF DRAWINGS

The above and other objects, features and advantages of the present disclosure will become more apparent from the following detailed description made with reference to the accompanying drawings. In the drawings:

FIG. 3 is an illustrative diagram illustrating a communication frame according to the first embodiment;

FIG. 4A is an illustrative diagram illustrating the communication frame according to the first embodiment;

FIG. 4B is an illustrative diagram illustrating the communication frame according to the first embodiment;

FIG. 5A is an illustrative diagram illustrating the communication frame according to the first embodiment;

FIG. 5B is an illustrative diagram illustrating the communication frame according to the first embodiment;

FIG. 5C is an illustrative diagram illustrating the communication frame according to the first embodiment;

DETAILED DESCRIPTION

Figure 1:
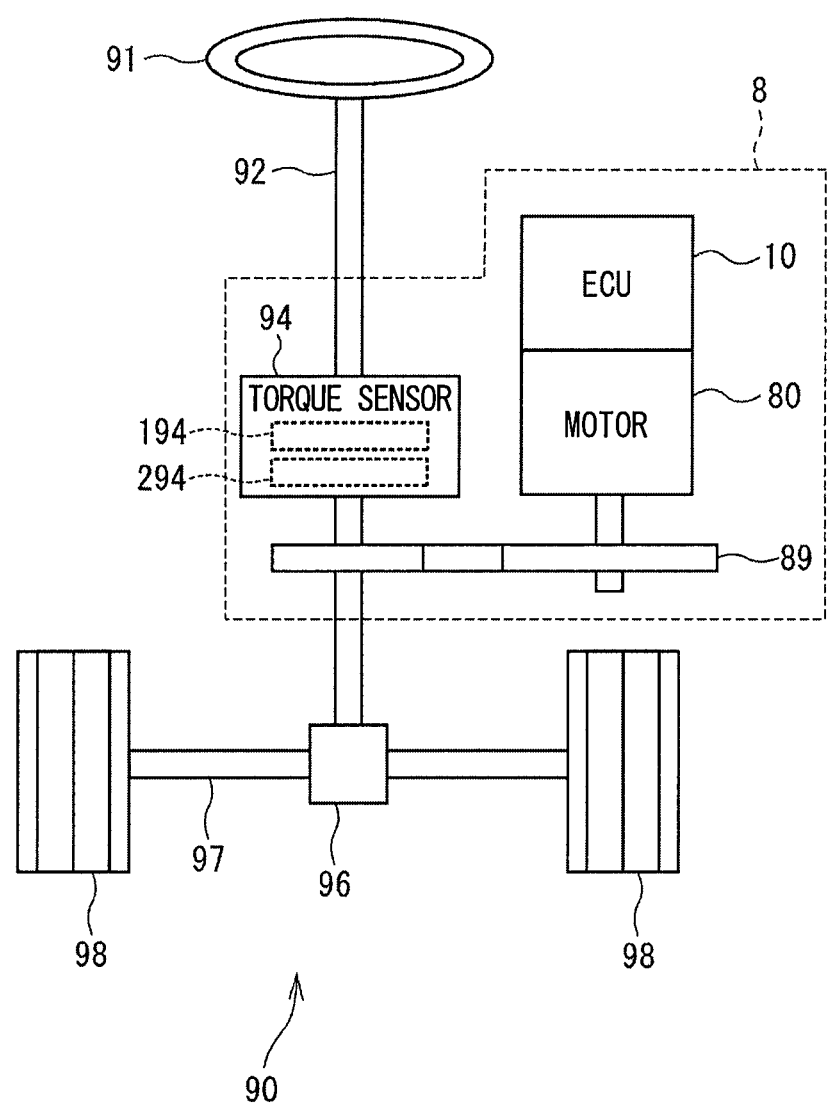
FIG. 1 is a schematic configuration diagram of a steering system according to a first embodiment.

In some rotary electric machine control devices, an abnormality determination is performed by monitoring an occurrence of an excessive current deviation and abnormality determination due to a cause other than the current deviation is not performed in order to simplify a configuration.

A rotary electric machine control device according to an aspect of the present disclosure is for controlling a rotary electric machine having multiple winding sets, and includes multiple inverter circuits, multiple power supply relays, and multiple controllers. The inverter circuits are provided correspondingly to the respective winding sets. Combinations of the winding sets and configurations provided correspondingly to the winding sets are defined as systems. The power supply relays are provided for respective systems, and each of the power supply relays is capable of switching conduction and non-conduction between a battery and the inverter circuit in a subject system that is one of the systems for which each of the power supply relays is provided.

The controllers are provided for the respective systems. Each of the controllers includes a drive controller, a subject system monitor, and a different system monitor. The driver controller is configured to control the inverter circuit and the power supply relay in the subject system. The subject system monitor is configured to monitor an abnormality of the subject system. The different system monitor is configured to monitor an abnormality of a different system that is one of the systems different from the subject system.

The drive controller is configured to turn off the power supply relay in the subject system when an abnormality requiring a power supply stop occurs in the subject system. The different system monitor is configured to acquire power supply relay information related to a state of the power supply relay in the different system through a signal line and is configured to monitor the abnormality of the different system based on the power supply relay information. The controllers monitors the abnormality of the subject system by the subject system monitor, and turns off the power supply relay in the subject system when the abnormality requiring the power supply stop occurs in the subject system. In other words, the power supply relays is turned on when the subject system is normal, and is turned off when the abnormality requiring the power supply stop occurs. Thus, the different system monitor can monitor a state of the different system based on the state of the power supply relay in the different system. Accordingly, the abnormality of the different system can be appropriately monitored.

Hereinafter, a rotary electric machine control device according to the present disclosure will be described with reference to the drawings. Hereinafter, in a plurality of embodiments, substantially the same components are denoted by the same reference numerals, and descriptions of the same components will be omitted.

First Embodiment

Figure 2:
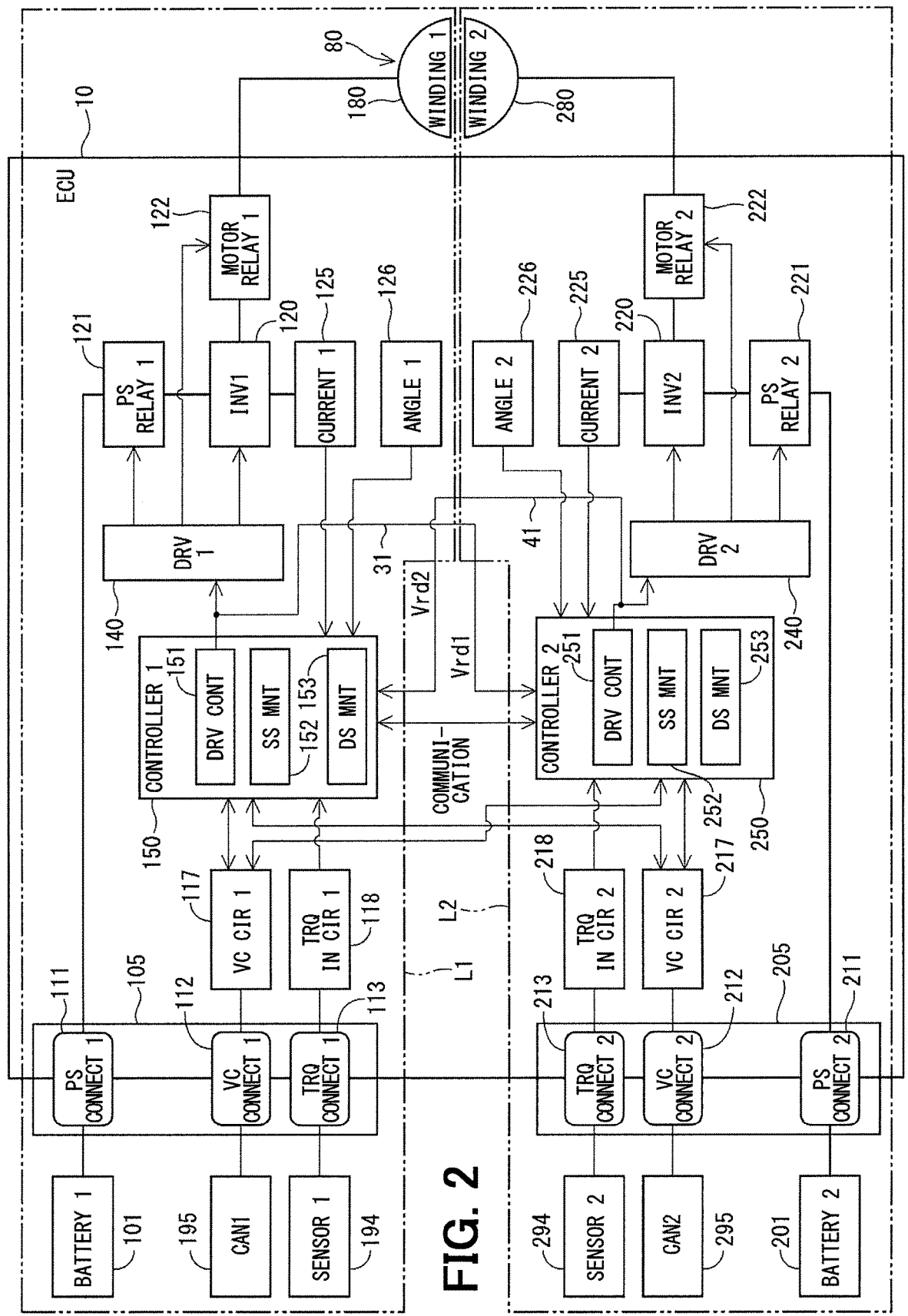
FIG. 2 is a block diagram showing a motor control device according to the first embodiment.

A first embodiment is shown in FIGS. 1 to 9B. As shown in FIGS. 1 and 2, a motor control device 10 as a rotary electric machine control device according to the present embodiment is applied to, for example, an electric power steering device 8 for assisting a steering operation of a vehicle together with a motor 80 as a rotary electric machine. In the drawing, the motor control device 10 is referred to as an "ECU".

FIG. 1 shows a configuration of a steering system 90 including the electric power steering device 8. The steering system 90 includes a steering wheel 91 as a steering member, a steering shaft 92, a pinion gear 96, a rack shaft 97, wheels 98, the electric power steering device 8, and the like.

The steering wheel 91 is connected to the steering shaft 92. The steering shaft 92 is provided with a torque sensor 94 for detecting a steering torque Ts. The torque sensor 94 has a first sensor unit 194 and a second sensor unit 294, and is duplicated. A pinion gear 96 is provided at a tip of the steering shaft 92. The pinion gear 96 engages with a rack shaft 97. The pair of wheels 98 is connected to both ends of the rack shaft 97 through tie rods or the like.

When a driver rotates the steering wheel 91, the steering shaft 92 connected to the steering wheel 91 rotates. A rotational movement of the steering shaft 92 is converted into a linear movement of the rack shaft 97 by the pinion gear 96. The pair of wheels 98 is steered to an angle corresponding to the displacement amount of the rack shaft 97.

The electric power steering device 8 includes the motor 80, a reduction gear 89 serving as a power transmission portion for reducing the rotation of the motor 80 and transmitting the reduced rotation to the steering shaft 92, the motor control device 10, and the like. In other words, the electric power steering device 8 according to the present embodiment is a so-called "column assist type", but may be a so-called "rack assist type" which transmits the rotation of the motor 80 to the rack shaft 97. In the present embodiment, the steering shaft 92 corresponds to "a drive target".

The motor 80 outputs an assisting torque for assisting the driver to steer the steering wheel 91, and is driven by an electric power supplied from batteries 101 and 201 as a power supply to rotate the reduction gear 89 forward and backward. The motor 80 is a three-phase brushless motor, and includes a rotor and a stator, both of which are not shown. As shown in FIG. 2, the motor 80 has a first motor winding 180 and a second motor winding 280 as a winding set. In the drawings, the first motor winding 180 is referred to as "WINDING 1" and the second motor winding 280 is referred to as "WINDING 2". In other configurations to be described later, a "first" is described as a subscript "1" and a "second" is described as a subscript "2" as appropriate in the drawings.

Hereinafter, a combination of the first motor winding 180, and a first inverter circuit (INV) 120, a first controller 150, and the like, which are provided correspondingly to the first motor winding 180 and are involved in an energization control of the first motor winding 180, will be referred to as a first system L1. A combination of the second motor winding 280 and the second inverter circuit (INV) 220, the second controller 250, and the like, which are provided correspondingly to the second motor winding 280 and are related to the energization control of the second motor winding 280, will be referred to as a second system L2. Hereinafter, a configuration related to the first system L1 is numbered by 100 series, and a configuration related to the second system L2 is numbered by 200 series. In the first system L1 and the second system L2, the same configurations are numbered so that the last two digits are the same.

The motor control device 10 includes inverter circuits 120 and 220, power supply relays (PS RELAY) 121 and 221, controllers 150 and 250, and so on. The motor control device 10 is provided with connector portions 105 and 205. The connector portion 105 includes a power supply connector (PS CONNECT) 111, a vehicle communication connector (VC CONNECT) 112, and a torque connector (TRQ CONNECT) 113. The connector portion 205 includes a power supply connector (PS CONNECT) 211, a vehicle communication connector (VC CONNECT) 212, and a torque connector (TRQ CONNECT) 213. In FIG. 2, each of the connector portions 105 and 205 may be formed as a single connector or may be divided into multiple connectors.

The first power supply connector 111 is connected to the first battery 101. An electric power of the first battery 101 is supplied to the first motor winding 180 through the power supply connector 111, the power supply relay 121, the inverter circuit 120, and a motor relay 122. The electric power of the first battery 101 is also supplied to the first controller 150 and the sensors of the first system L1. The second power supply connector 211 is connected to the second battery 201. An electric power of the second battery 201 is supplied to the second motor winding 280 through the power supply connector 211, the power supply relay 221, the inverter circuit 220, and a motor relay 222. The power supply connectors 111 and 211 may be connected to the same battery and may share the battery in the systems L1 and L2.

The first vehicle communication connector 112 is connected to a vehicle communication network 195 and a first vehicle communication circuit (VC CIR) 117, and the second vehicle communication connector 212 is connected to a vehicle communication network 295 and a second vehicle communication circuit (VC CIR) 218. The vehicle communication connectors 112 and 212 may be connected to the same vehicle communication network. In FIG. 2, a CAN (Controller Area Network) is illustrated as the vehicle communication networks 195 and 295, but any standard may be used, such as a CAN-FD (CAN with Flexible Data rate) or a FlexRay. The first torque connector 113 is connected to the first sensor unit (SENSOR) 194 of the torque sensor 94 and a first torque sensor input circuit (TRQ IN CIR) 118. The second torque connector 213 is connected to the second sensor unit (SENSOR) 294 of the torque sensor 94 and a second torque sensor input circuit (TRQ IN CIR) 218.

The first inverter circuit 120 is a three-phase inverter having a switching element (not shown), and converts an electric power supplied to the first motor winding 180. The on-off operation of the switching element of the first inverter circuit 120 is controlled based on a drive signal output from the first controller 150. The second inverter circuit 220 is a three-phase inverter having a switching element (not shown), and converts an electric power supplied to the second motor winding 280. The on-off operation of the switching element of the second inverter circuit 220 is controlled based on the drive signal output from the second controller 250.

The first power supply relay 121 is provided between the first power supply connector 111 and the first inverter circuit 120. The first power supply relay 121 is controlled by the first controller 150, and when the first power supply relay 121 is on, a conduction between the first battery 101 and the first inverter circuit 120 is permitted, and when the first power supply relay 121 is off, the conduction between the first battery 101 and the first inverter circuit 120 is prohibited. The second power supply relay 221 is provided between the second power supply connector 211 and the second inverter circuit 220. The second power supply relay 221 is controlled by the second controller 250, and when the second power supply relay 221 is on, a conduction between the second battery 201 and the second inverter circuit 220 is permitted, and when the second power supply relay 221 is off, the conduction between the second battery 201 and the second inverter circuit 220 is prohibited.

The power supply relays 121 and 221 according to the present embodiment are semiconductor relays such as a MOSFET. When the power supply relays 121 and 221 have parasitic diodes such as a MOSFET, it is desirable to provide a reverse connection protective relay (not shown) connected so as to reverse the directions of the power supply relays 121 and 221 and the parasitic diodes. The power supply relays 121 and 221 may be mechanical relays.

The first motor relay 122 is provided in each phase between the first inverter circuit 120 and the first motor winding 180. The first motor relay 122 is controlled by the first controller 150, allowing a conduction between the first inverter circuit 120 and the first motor winding 180 when the first motor relay 122 is on, and prohibiting the conduction between the first inverter circuit 120 and the first motor winding 180 when the first motor relay 122 is off. The second motor relay 222 is provided in each phase between the second inverter circuit 220 and the second motor winding 280. The second motor relay 222 is controlled by the second controller 250, allowing a conduction between the second inverter circuit 220 and the second motor winding 280 when the second motor relay 222 is on, and prohibiting the conduction between the second inverter circuit 220 and the second motor winding 280 when the second motor relay 222 is off.

A first current sensor (CURRENT) 125 detects a first U-phase current Iu1, a first V-phase current Iv1, and a first W-phase current Iw1, which are supplied to the respective phases of the first motor winding 180, and outputs detection values to the first controller 150. A second current sensor (CURRENT) 225 detects a second U-phase current Iu2, a second V-phase current Iv2, and a second W-phase current Iw2, which are supplied to the respective phases of the second motor winding 280, and outputs the detection values to the second controller 250. A first rotation angle sensor (ANGLE) 126 detects a rotation angle of the motor 80 and outputs the detected rotation angle to the first controller 150. A second rotation angle sensor (ANGLE) 226 detects a rotation angle of the motor 80 and outputs the detected rotation angle to the second controller 250.

A first driver circuit (DRV) 140 outputs signals for driving the switching element of the first inverter circuit 120, the first power supply relay 121, and the first motor relay 122 to each element based on a control signal from the first controller 150. A second driver circuit (DRV) 240 outputs signals for driving the switching element of the second inverter circuit 220, the second power supply relay 221, and the second motor relay 222 to each element based on a control signal from the second controller 250.

The first controller 150 includes a drive controller (DRV CONT) 151, a subject system monitor (SS MNT) 152, and a different system monitor (DS MNT) 153. The second controller 250 includes a drive controller (DRV CONT) 251, a subject system monitor (SS MNT) 252, and a different system monitor (DS MONT) 253. The controllers 150 and 250 are mainly configured by microcomputers. Each processing in the controllers 150 and 250 may be software processing by executing a program stored in advance in a tangible memory device such as a ROM by a CPU, or may be hardware processing by a dedicated electronic circuit. The controllers 150 and 250 are capable of transmitting and receiving information to and from each other by communication through a communication path. Hereinafter, the communication between the controllers 150 and 250 is referred to as "inter-microcomputer communication" as appropriate. Further, a signal acquired from the different system by the inter-microcomputer communication is referred to as "different system signal".

The drive controller 151 generates an inverter drive signal for controlling the on-off operation of the switching element of the first inverter circuit 120. The driving of the motor 80 is controlled by turning on and off the switching element based on the generated inverter drive signal. The drive controller 151 generates a power supply relay drive signal Vrd1 for controlling the power supply relay 121 and a motor relay drive signal for controlling the motor relay 122.

The drive controller 251 generates an inverter drive signal for controlling the on-off operation of the switching element of the second inverter circuit 220. The driving of the motor 80 is controlled by turning on and off the switching element based on the generated inverter drive signal. The drive controller 251 generates a power supply relay drive signal Vrd2 for controlling the power supply relay 221 and a relay control signal for controlling the motor relay 222.

The drive controllers 151 and 251 share information by the inter-microcomputer communication. As shown in FIG. 3, a communication frame of the inter-microcomputer communication includes an update counter, a current detection value, a current command value, a current limit value, a status signal, and a CRC signal which is an error detection signal. The number of bits and the like can be appropriately set. The order of signals may be changed or other information may be added. The error detection signal may be, for example, a checksum signal or the like other than the CRC signal. According to the present embodiment, the current detection value, the current command value, and the current limit value are values of the dq-axis, but may be values of three phases or the like. The current command value may be replaced with a torque command value or a voltage command value.

The controllers 150 and 250 perform a cooperative control so as to transmit and receive the current detection value, the current command value, and the like to and from each other by the inter-microcomputer communication, and drive the motor 80 in synchronization with the systems L1 and L2. For example, one of the controllers 150 and 250 may be set as a master and the other may be set as a slave, and the slave may be coordinated in accordance with a command from the master. The signal transmitted from the master side to the slave side and the signal transmitted from the slave side to the master side may be the same as each other, or the transmission of the command value from the slave side to the master side may be omitted. The signal transmitted from the master side may be different from the signal transmitted from the slave side. For example, as shown in the FIG. 4A, a communication frame of the signal transmitted from the master side to the slave side includes an update counter, a current detection value, a current command value, a status signal, and a CRC signal. As shown in the FIG. 4B, a communication frame of the signal transmitted from the slave side to the master side includes a current limit value instead of the current command value. When the multiple controllers are used separately on the master side and the slave side, a communication traffic can be reduced by narrowing down the communication to necessary information. The two systems may be coordinated by controlling the sum and difference of the currents in the systems L1 and L2.

The subject system monitor 152 monitors an abnormality in the first system L1, which is a subject system. When an abnormality requiring the power supply stop occurs in the subject system, the first controller 150 turns off the first power supply relay 121 and stops the power supply to the first motor winding 180. The different system monitor 153 monitors an abnormality of the second system L2, which is a different system, based on the information acquired by the inter-microcomputer communication from the second controller 250 and the state of the second power supply relay 221. According to the present embodiment, the first controller 150 acquires the second power supply relay drive signal Vrd2 for driving the second power supply relay 221 output from the drive controller 251 through a signal line 41, and monitors the state of the second power supply relay 221 based on the second power supply relay drive signal Vrd2.

The subject system monitor 252 monitors an abnormality in the second system L2, which is a subject system. When an abnormality requiring the power supply stop occurs in the subject system, the second controller 250 turns off the second power supply relay 221, and stops the power supply to the second motor winding 280. The different system monitor 253 monitors the abnormality in the first system L1, which is a different system, based on the information acquired by the inter-microcomputer communication from the first controller 150 and the state of the first power supply relay 121. According to the present embodiment, the second controller 250 acquires the first power supply relay drive signal Vrd1 for driving the first power supply relay 121 output from the drive controller 151 through a signal line 31, and monitors the state of the first power supply relay 121 based on the first power supply relay drive signal Vrd1. The power supply relay drive signals Vrd1 and Vrd2 are signals output from the controllers 150 and 250, and the voltages of the signals output from the controllers 150 and 250 are less likely to vary due to an influence of the battery voltage and the like, so that thresholds are easily set.

The abnormality monitoring will be described below. In this example, the first system L1 is the subject system, and the second system L2 is the different system, and the processing in the first controller 150 will be mainly described. The processing in the second controller 250 is the same as the processing in the first controller 150 when the second system L2 is set as the subject system and the first system L1 is set as the different system.

The first controller 150 is configured to be able to directly acquire the on and off state of the second power supply relay 221. According to the present embodiment, the different system monitor 153 monitors the second power supply relay drive signal Vrd2 directly acquired through the signal line 41. As described above, when the abnormality requiring the power supply stop occurs in the second system L2, the second controller 250 turns off the second power supply relay 221 and stops the power supply to the second motor winding 280. For that reason, when the second power supply relay 221 is turned off during a system activation, it can be determined that an abnormality has occurred in the second system L2. However, if an abnormality such as a disconnection or a short-circuit occurs in the signal line 41 for acquiring the power supply relay drive signal Vrd2, there is a possibility of erroneous determination.

In addition, the first controller 150 monitors the abnormality of the second system L2 based on the information acquired from the second controller 250 in the inter-microcomputer communication. More specifically, the communication disruption can be detected by monitoring the update counter, and a signal abnormality such as biting can be detected by the CRC signal. In addition, since the status signal is a signal including information corresponding to the monitoring result of the subject system monitor 252 of the second controller 250, the first controller 150 can identify the type of abnormality that occurs in the second system L2 based on the status signal. When an abnormality occurs, fail information, sensor information, or the like may be added, or the content of the communication frame may be changed.

For example, when information indicating that an abnormality has occurred in the second sensor unit 294 is included in the status signal acquired from the second controller 250, if the first sensor unit 194 is normal, the first controller 150 transmits the status signal to the second controller 250. FIG. 5A is the same as that of FIG. 3, and is a communication frame in a normal state. In FIG. 5B, a steering torque value is added to a communication frame of the signal transmitted from the first controller 150 to the second controller 250. When the communication traffic is limited and new information cannot be added, the information to be included in the communication frame is determined in consideration of the priority. For example, when the priority of the steering torque value is higher than the current limit value, the steering torque value is included in the communication frame in place of the current limit value, as shown in the FIG. 5C.

In this case, as an example, a case in which the abnormality occurs in the second sensor unit 294 has been described, but the communication frame can be similarly changed even when an abnormality occurs in the rotation angle sensor 226 or the like. When an abnormality occurs in the first system L1, the communication frame of the signal transmitted from the second controller 250 may be appropriately changed. As a result, when an abnormality occurs in the multiplexed sensor or the like, the control can be appropriately continued with the use of the normal detection value by transmitting the normal information through the inter-microcomputer communication.

However, when an abnormality such as a disconnection or a short circuit occurs in the communication path used for the inter-microcomputer communication, or when a communication abnormality occurs, there is a possibility of erroneous determination. Therefore, according to the present embodiment, the on and off state of the power supply relay in the different system and the information obtained by the inter-microcomputer communication are combined together to monitor the abnormality of the different system.

Figure 6:
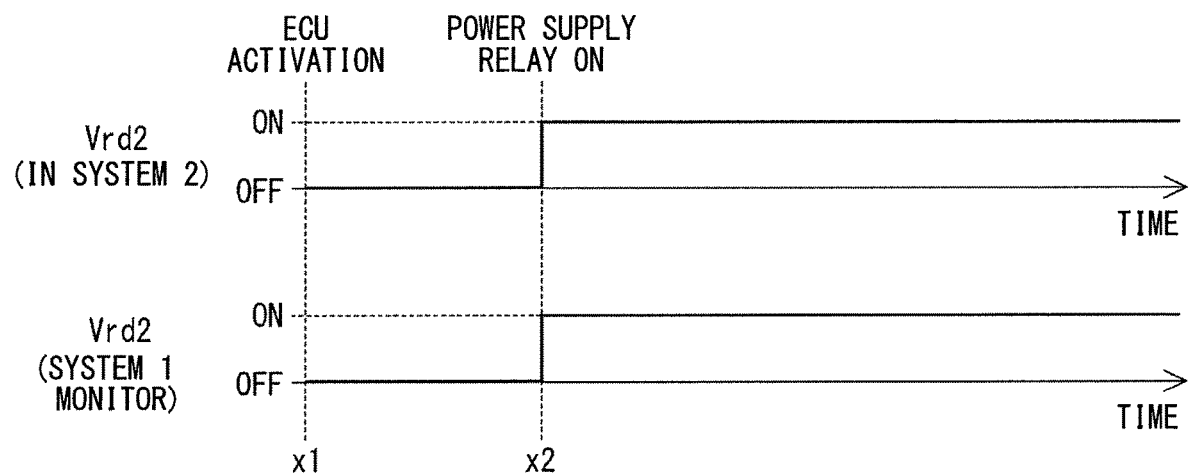
FIG. 6 is a time chart illustrating an initial check of a power supply relay according to the first embodiment.

First, the different system monitor 153 of the first controller 150 determines whether or not the second power supply relay 221 is operating normally by an initial check at a time of activating the motor control device 10. As shown in FIG. 6, the second power supply relay 221 is turned on in the second system L2 based on the power supply relay drive signal Vrd2 from the drive controller 251 at a time x2 within a predetermined time from a time x1 at which the ECUs are activated. When the power supply relay drive signal Vrd2 acquired through the signal line 41 is turned on in the different system monitor 153, it is determined that the second power supply relay 221 is operating normally.

Figure 7:
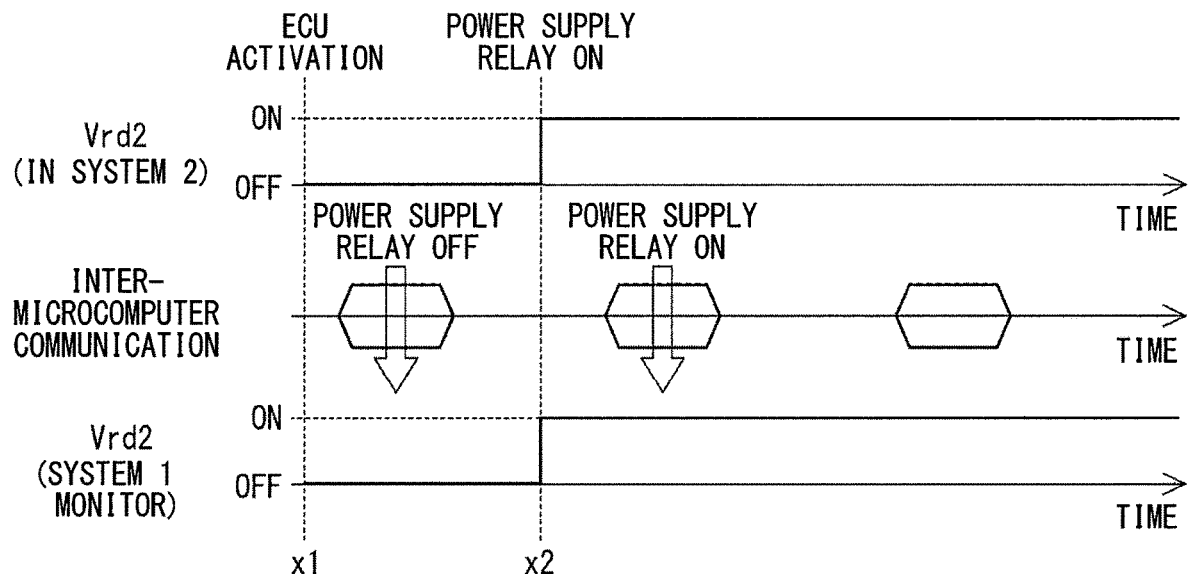
FIG. 7 is a time chart illustrating the initial check of the power supply relay according to the first embodiment.

As shown in FIG. 7, the different system monitor 153 acquires a signal indicating that the second power supply relay 221 has been turned on from the second controller 250 by the inter-microcomputer communication. If the information acquired by the inter-microcomputer communication is "power supply relay on" and the power relay drive signal Vrd2 acquired through the signal line 41 is turned on, the different system monitor 153 determines that the second power supply relay 221 is operating normally. The operation of the power supply relay of the different system may be confirmed on the basis of the power supply relay drive signal Vrd2 acquired by the signal line 41 as shown in FIG. 6, or may be confirmed on the basis of the consistency between the inter-microcomputer communication and the power supply relay drive signal Vrd2 as shown in FIG. 7. If it can be confirmed by the initial check that the second power supply relay 221 is operating normally in the different system monitor 153, it is determined that the different system monitoring function is normal.

Figure 8:
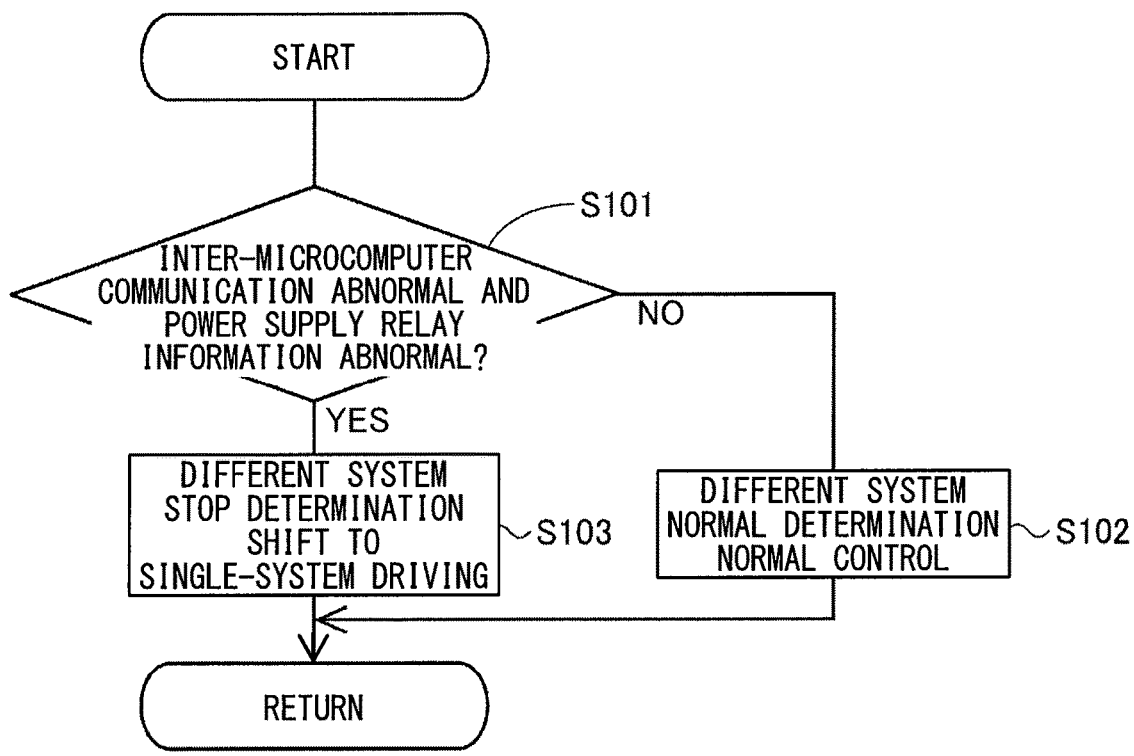
FIG. 8 is a flowchart illustrating an abnormality monitoring process according to the first embodiment.

The abnormality monitoring process in the first controller 150 will be described with reference to a flowchart of FIG. 8. This processing is executed at a predetermined cycle after it is determined by the initial check that the different system monitoring function is normal. In S101, the different system monitor 153 determines whether or not the inter-microcomputer communication is abnormal and the power supply relay information of the different system is abnormal. In this example, the power supply relay information is the power supply relay drive signal Vrd2, and when the voltage of the power supply relay drive signal Vrd2 is lower than a determination threshold, it is determined that the power supply relay information is abnormal.

When it is determined that the inter-microcomputer communication is normal or the power supply relay information is normal (NO in S101), the process proceeds to S102, the different system is determined to be normal, and the normal control is continued. For example, even if the inter-microcomputer communication is abnormal, if it is confirmed that the power supply relay drive signal Vrd2 is normal and the second power supply relay 221 is turned on, it can be determined that the second system L2 per se is normal even though the inter-microcomputer communication is abnormal. Further, for example, even if the voltage of the power supply relay drive signal Vrd2 is lowered, if it is confirmed that the second system L2 is normal in the inter-microcomputer communication, it can be determined that the voltage is lowered due to disconnection of the signal line 41 or the like.

When it is determined that the inter-microcomputer communication is abnormal and the power supply relay information of the different system is abnormal (YES in S101), the process proceeds to S103. In S103, the first controller 150 determines that the second system L2, which is the different system, is stopped, and shifts to a single-system driving.

According to the present embodiment, the two controllers 150 and 250 control the energization of the motor windings 180 and 280, respectively, and drive the motor 80 in two systems. For that reason, as shown in the FIG. 9B, when the second system L2 is stopped due to an abnormality occurring in the second system L2 at a time xa, if the control is continued by the first system L1, the command value and the like are not changed and the output is lowered.

Therefore, according to the present embodiment, the first controller 150 monitors the operation state of the second system L2, which is a different system. As shown in the FIG. 9A, when an abnormality occurs in the second system L2 and the second system L2 stops at the time xa, the process proceeds to the single-system driving as a backup control at a time xb, and an output change procedure is performed in the first system L1, thereby being capable of reducing a decrease in the output. For example, if the outputs of the systems L1 and L2 are equal to each other and the sum of the outputs of the two-system total is equal to or less than (½) of a rating, the output of the first system L1 is doubled, thereby being capable of obtaining an output comparable to the output before the occurrence of the abnormality in the second system L2. When the sum of the outputs of the two-system total is larger than (½) of the rating, it is desirable to set the output of the first system L1 to a maximum output corresponding to the rating or the like.

Figure 9A:
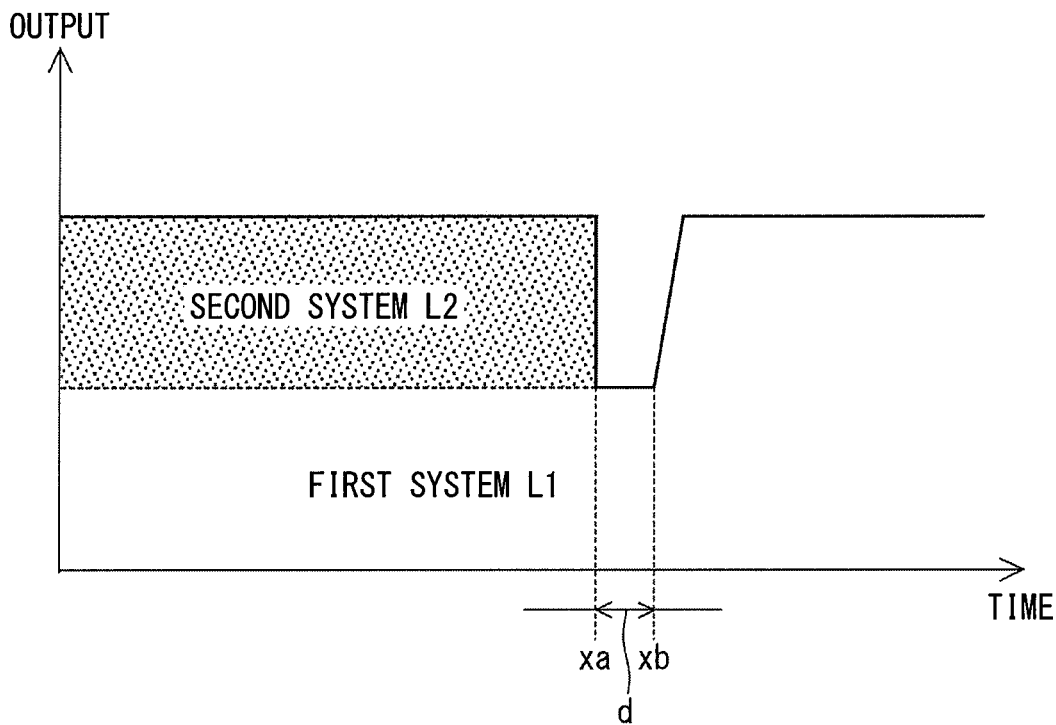
FIG. 9A is a time chart illustrating a single-system driving according to the first embodiment.
Figure 9B:
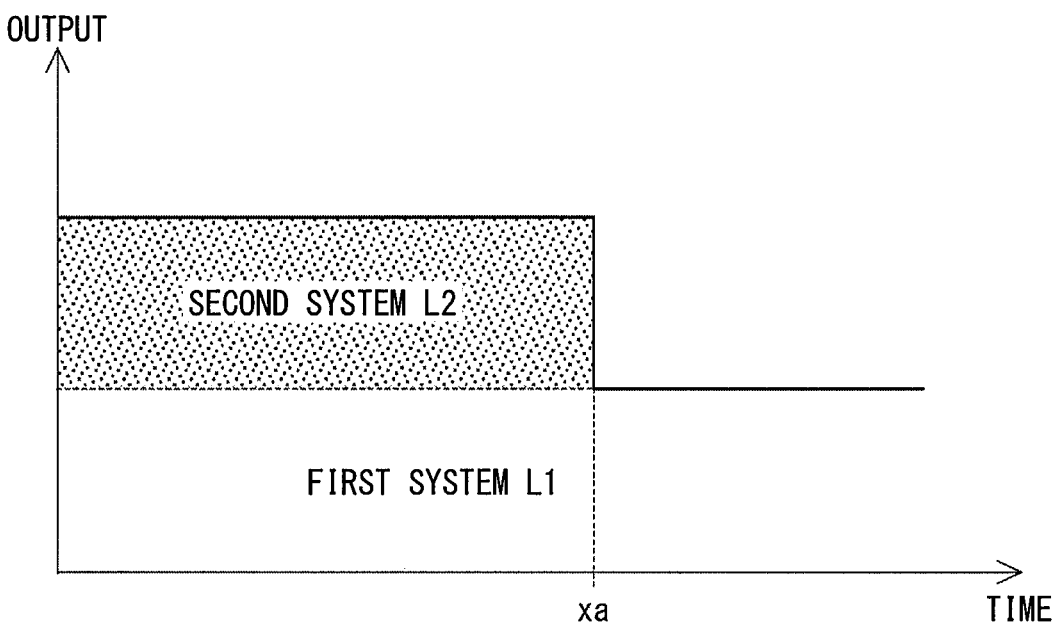
FIG. 9B is a time chart illustrating the single-system driving according to the first embodiment.

A time d from the time xa at which the abnormality occurs to the time xb at which the drive shifts to the single-system driving is a time required for the abnormality determination, a time required for the different system monitoring, and a time required for the output change procedure at the time of the single-system drive. The output change procedure includes, for example, a change in assist characteristics such as a change in a map or a change in current control, a change in a control constant such as a constant used for PI control, a constant related to overheat protection, a current limit value, and a power limit value. In FIG. 9A and FIG. 9B, the output of the second system L2 are shown by dotted pattern.

As described above, the motor control device 10 according to the present embodiment controls the motor 80 having the multiple motor windings 180 and 280, and includes the multiple inverter circuits 120 and 220, the multiple power supply relays 121 and 221, and the multiple controllers 150 and 250. The inverter circuits 120 and 220 are provided for the motor windings 180 and 280, respectively. When combinations of the motor windings 180 and 280 and the configurations provided correspondingly to the respective motor windings 180 and 280 are defined as systems, the power supply relays 121 and 221 are provided for the respective systems. The first power supply relay 121 is capable of switching a conduction and non-conduction between the first battery 101 and the first inverter circuit 120. The second power supply relay 221 is capable of switching between a conduction and non-conduction between the second battery 201 and the second inverter circuit 220.

The controllers 150 and 250 are provided for the respective systems. The first controller 150 includes the drive controller 151, the subject system monitor 152, and the different system monitor 153. The second controller 250 includes the drive controller 251, the subject system monitor 252, and the different system monitor 253. The drive controllers 151 and 251 control the inverter circuits 120 and 220 and the power supply relays 121 and 221. The subject system monitors 152 and 252 monitor abnormalities of the respective subject systems, which are own systems. The different system monitors 153 and 253 monitor abnormalities of different systems, which are systems other than the subject systems.

The drive controllers 151 and 251 turn off the power supply relays 121 and 221 of the respective subject systems when an abnormality requiring a power supply stop occurs in the subject systems. The abnormality requiring the power supply stop is, for example, an abnormality of the inverter circuits 120 and 220, the motor windings 180 and 280, or the like. Further, for example, a sensor abnormality of the torque sensor 94 or the rotation angle sensors 126 and 226 may be regarded as an abnormality requiring the power supply stop, or may be regarded as an abnormality requiring no power supply stop.

The different system monitor 153 acquires a power supply relay information related to the state of the power supply relay 221 in the second system L2, which is the different system, through a signal line 41, and monitors the abnormality of the second system L2 based on the power supply relay information. The different system monitor 253 acquires the power supply relay information related to the state of the power supply relay 121 in the first system L1, which is the different system, through a signal line 31, and monitors the abnormality of the first system L1 based on the power supply relay information. The power supply relay information according to the present embodiment is power supply relay drive signals Vrd1 and Vrd2.

According to the present embodiment, the controllers 150 and 250 monitor the abnormality of the self-system by the subject system monitors 152 and 252, and when an abnormality requiring the power supply stop occurs, the power supply relays 121 and 221 of the subject systems are turned off. In other words, the power supply relays 121 and 221 are turned on if the subject systems are normal, and are turned off if any abnormality requiring the power supply stop occurs. According to the present embodiment, since the different system monitors 153 and 253 acquire the power supply relay information related to the states of the power supply relays 221 and 121 in the different systems, the different system monitors 153 and 253 can appropriately monitor the states of the different systems based on the power supply relay information.

The controllers 150 and 250 are capable of transmitting and receiving information to and from each other by the inter-microcomputer communication. The different system monitors 153 and 253 monitor the abnormalities of the different systems based on the information acquired from the controllers 250 and 150 of the different systems through the communication. In addition to the power supply relay information, with the use of the information acquired by the inter-microcomputer communication, the state of the different systems can be more appropriately monitored. When the power supply relay information is abnormal and a communication abnormality occurs, the different system monitors 153 and 253 determine that an abnormality occurs in the different system. This makes it possible to prevent erroneous determination.

When an abnormality of the different system has been detected, the drive controllers 151 and 251 shift to the backup control. According to the present embodiment, when an abnormality of the different system has been detected, the process proceeds to the single-system driving. As a result, the drive of the motor 80 can be appropriately continued. The different system monitors 153 and 253 determine the abnormality of the power supply relays 221 and 121 in the different systems based on the power supply relay information by the initial check at the time of activation. This makes it possible to appropriately detect the abnormality of the power supply relays 121 and 221 themselves.

The electric power steering device 8 includes the motor control device 10, the motor 80, and the reduction gear 89. The motor 80 outputs an assist torque for assisting the driver to steer the steering wheel 91. The reduction gear 89 transmits the driving force of the motor 80 to the steering shaft 92. According to the present embodiment, not only the motor windings 180 and 280 and the inverter circuits 120 and 220, but also control components including the controllers 150 and 250 and sensors are systematized. As a result, even when an abnormality occurs in one of the control components, the drive of the motor 80 can be continued and the steering assist can be continued. In addition, since the controllers 150 and 250 monitor the abnormality of the different systems, when the abnormality occurs in the different systems, the control can appropriately shift to the backup control. In addition, since the abnormalities of the different systems are monitored by the different system monitors 153 and 253, and the control can shift to the backup control when the abnormality occurs, for example, the motor control device 10 according to the present embodiment can be suitably used also for the electric power steering device 8.

Second Embodiment

Figure 10:
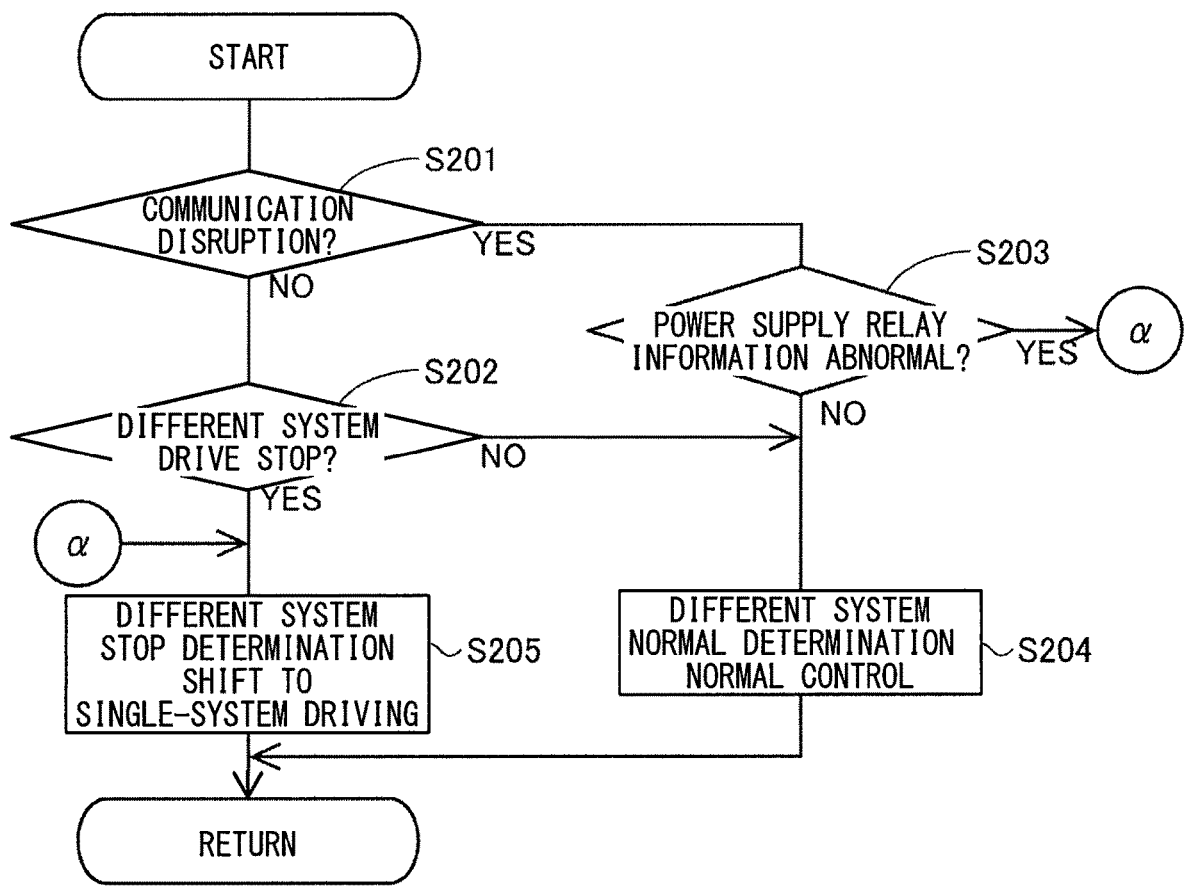
FIG. 10 is a flowchart illustrating an abnormality monitoring process according to a second embodiment.

A second embodiment is shown in FIG. 10. The second embodiment and a third embodiment are different from the embodiment described above in the abnormality monitoring process, and therefore, a description will be focused on the abnormality monitoring process. Also in the second embodiment and the third embodiment, the first system L1 is set to "subject system" and the second system L2 is set to "different system", and the processing in the first controller 150 will be described. In S201, the different system monitor 153 determines whether or not a communication disruption of a signal from a second controller 250 occurs based on a count value of an update counter of the different system signal. When it is determined that the communication disruption occurs (YES in S201), the process proceeds to S203. When it is determined that the communication is not disrupted (NO in S201), the process proceeds to S202.

In S202, the different system monitor 153 determines whether or not the second system L2 has stopped driving based on the status signal of the different system signal. When it is determined that the drive of the second system L2 is not stopped (NO in S202), the process proceeds to S204. When it is determined that the drive of the second system L2 is stopped (YES in S202), the process proceeds to S205.

In S203 to which the process shifts in the case where the communication is disrupted, the different system monitor 153 determines whether or not the power supply relay information is abnormal. Similar to the first embodiment, when the voltage of the power supply relay drive signal Vrd2, which is the power supply relay information, is lower than a determination threshold, it is determined that the power supply relay information is abnormal. When it is determined that the power supply relay information is normal (NO in S203), the process proceeds to S204. When it is determined that the power supply relay information is abnormal (YES in S203), the process proceeds to S205. The processing in S204 and S205 is the same as the processing in S102 and S103 in FIG. 8.

For example, when the abnormality monitoring of the inter-microcomputer communication is performed separately from this processing and the different system signals are normal, the abnormality monitoring is performed by giving priority to the information by the inter-microcomputer communication as in the present embodiment. Further, according to the present embodiment, when a communication disruption occurs, it is determined whether the different system signal is not output due to the abnormality of the second system L2 or whether the second system L2 is normal and a communication abnormality occurs, based on the power supply relay information.

According to the present embodiment, the different system monitors 153 and 253 monitor the abnormality of the different system based on the information acquired from the controllers 250 and 150 in the different systems by the communication in the normal state. When a communication disruption occurs, the different system monitors 153 and 253 monitor the abnormality of the different systems based on the power supply relay information acquired through the signal lines 31 and 41. More specifically, when a communication disruption occurs, the different system monitors 153 and 253 determine whether the different system abnormality or the communication abnormality occurs based on the power supply relay drive signals Vrd1 and Vrd2 which are power supply relay information. This makes it possible to more appropriately monitor the different system abnormality. In addition, the same effects as those of the embodiment described above can be obtained.

Third Embodiment

Figure 11:
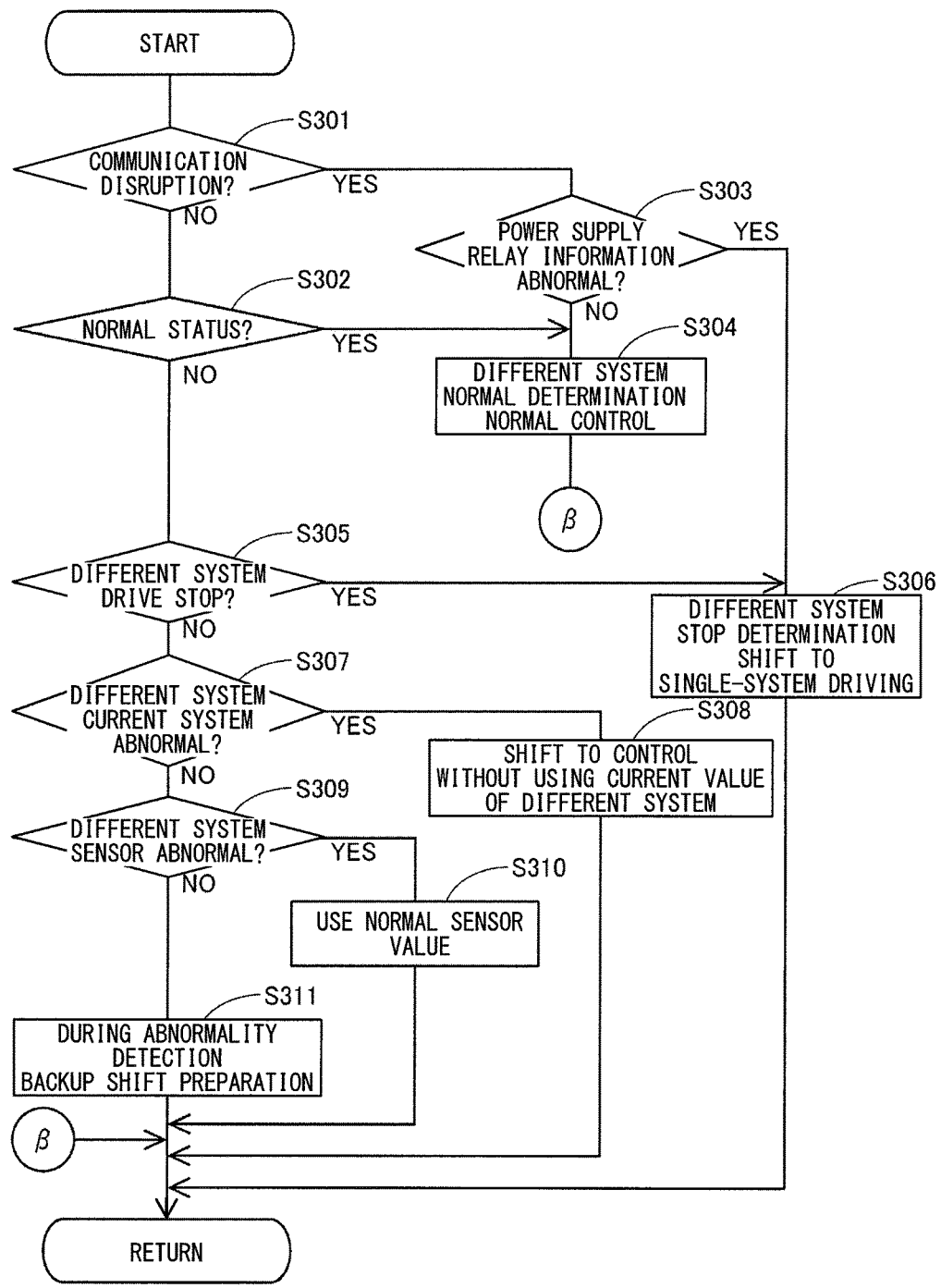
FIG. 11 is a flowchart illustrating an abnormality monitoring process according to a third embodiment.

A third embodiment is shown in FIG. 11. Processing in S301 is the same as the processing in S201 in FIG. 10. In S302, the different system monitor 153 determines whether or not the status signal of the different system signal is normal. If it is determined that the status signal is normal (YES in S302), the process proceeds to S304. If it is determined that the status signal includes information indicating the abnormality (NO in S302), the process proceeds to S305. The processing of S303 and S304 is the same as the processing of S203 and S204 in FIG. 10. If an affirmative determination is made in S303, the process proceeds to S306.

In S305 to which the process shifts in the case where abnormality information is included in the status signal, the different system monitor 153 determines whether or not the second system L2 has stopped driving. When it is determined that the drive of the second system L2 has been stopped, the process proceeds to S306. When it is determined that the drive of the second system L2 has not been stopped (NO in S305), the process proceeds to S307. The processing in S306 is the same as the processing in S205 in FIG. 10.

In S307, the different system monitor 153 determines whether or not the different system current system abnormality has occurred based on the status signal of the different system signal. The different system current system abnormality includes the abnormality of the current sensor 125 or the like. When it is determined that the different system current system abnormality has occurred (YES in S307), the process proceeds to S308. If it is determined that no different system current system abnormality has occurred (NO in S307), the process proceeds to S309. In S308, the first controller 150 switches to a control that does not use the current value of the second system L2. For example, when a sum and a difference of the currents of the systems L1 and L2 are controlled in the normal state, the current control is switched to the current control for each system.

In S309, the different system monitor 153 determines whether or not a different system sensor abnormality has occurred based on the status signal of the different system signal. In this example, the abnormality of the rotation angle sensor 226 or the second sensor unit 294 of the torque sensor 94 is referred to as "different system sensor abnormality". If it is determined that the different system sensor abnormality has occurred (YES in S309), the process proceeds to S310. If it is determined that no different system sensor abnormality have occurred (NO in S309), the process proceeds to S311.

In S310, the first controller 150 shifts to the control using the normal value instead of the value of the sensor in which the abnormality has occurred. In S311, the first controller 150 determines that any abnormality is being detected in the second system L2, and prepares for shifting to the backup control. In addition, the abnormality counter is incremented. For example, if the abnormality counter reaches or exceeds a determination value within a predetermined time, the abnormality is determined.

The status signal includes information indicating whether or not the different system is in a driving stop state, information indicating a state of the sensor or the like in the different system, and the like. When the different system is stopped, the backup control is set to the single-system driving in the normal system. The assist amount at this time is desirably changed as described in the first embodiment. When the status signal includes information indicating that some abnormality has occurred in the different system and that the abnormality has not yet been determined, preparation for transition to the backup control is performed. For example, in the case of shifting to the single-system driving by the backup control, preparation for increasing the assist is made in preparation for shifting. This makes it possible to more quickly shift to the backup control. Further, the reliability determination of the information acquired from the different system is performed.

When the status signal indicates an abnormality in the current system of the second system L2, such as an abnormality in the current sensor 225, the backup control is switched to the control not using the current detection value of the second system L2. According to the present embodiment, the first controller 150 switches the control to the control for each system instead of the control for the sum and the difference. When the status signal indicates the abnormality of the rotation angle sensor 226 or the second sensor unit 942 of the torque sensor 94, the first controller 150 supplements necessary information by the inter-microcomputer communication, and continues the assist in the two systems. At this time, the cooperative control may be stopped, and the control may be switched to the control for each system. According to the present embodiment, in the case of the abnormality of the current system or the different system sensor abnormality, the assist in the two systems is continued by the backup control, but the backup control may be set as the single-system driving.

When the status signal indicates that the initial check is in progress, the system waits without performing the control using the output signal including the status signal. In the present embodiment, since the status signal includes the information indicating the driving state and the abnormal state of each system, the optimum backup control can be selected according to the state of the different system. In addition, the same effects as those in the embodiments described above can be obtained.

Fourth Embodiment

Figure 12:
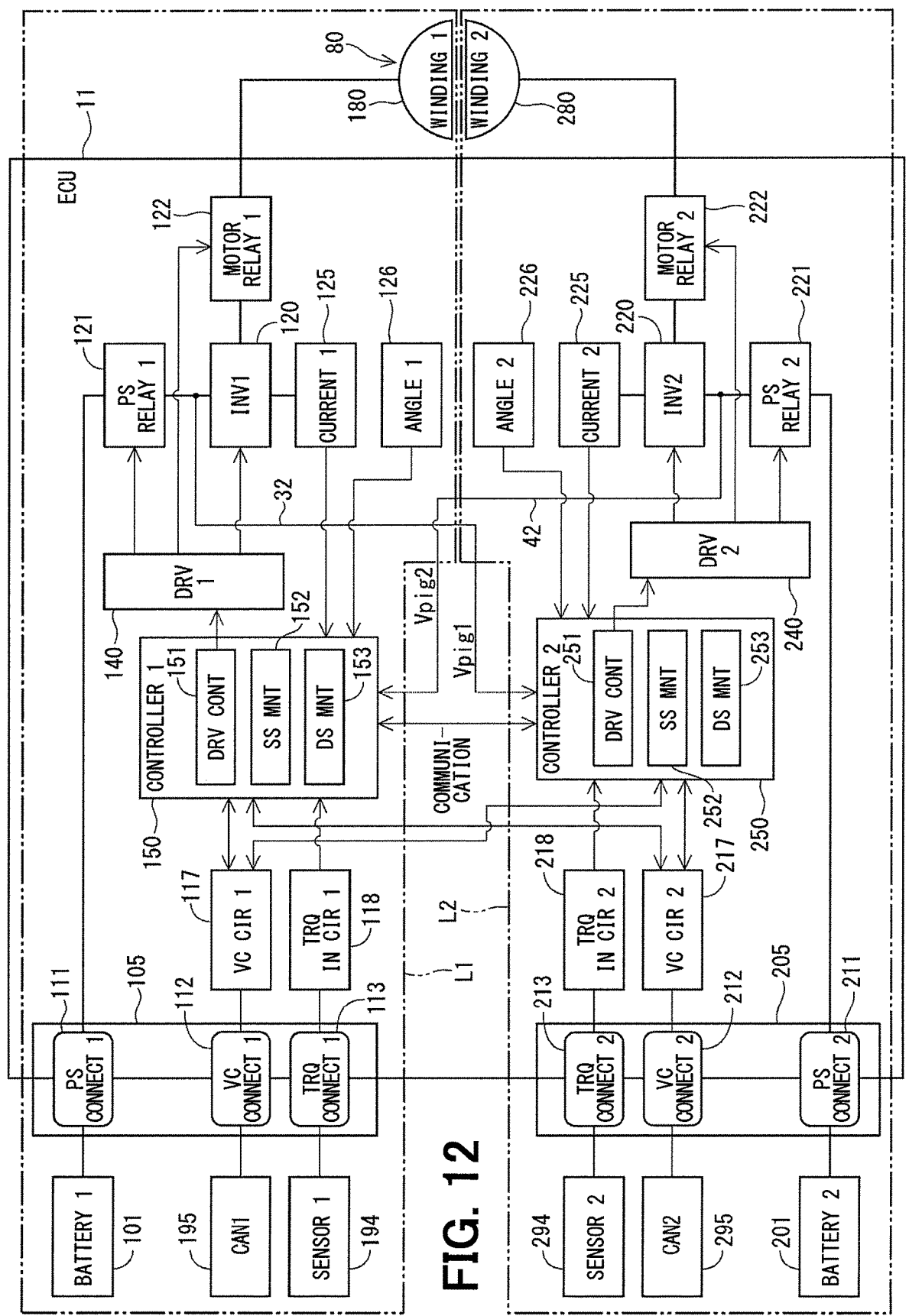
FIG. 12 is a block diagram showing a motor control device according to a fourth embodiment.

A fourth embodiment is shown in FIG. 12. The fourth embodiment and a fifth embodiment are different from the embodiments described above in the monitoring point in the different system monitors 153 and 253, and therefore, a description will be focused on the monitoring point. In the motor control device 11 of the present embodiment, the different system monitor 153 acquires a second post-relay voltage Vpig2, which is a voltage between the second power supply relay 221 and the second inverter circuit 220, through the signal line 42, and monitors a state of the second power supply relay 221 based on the second post-relay voltage Vpig2. In addition, the different system monitor 253 acquires a first post-relay voltage Vpig1, which is a voltage between the first power supply relay 121 and the first inverter circuit 120, through the signal line 32, and monitors a state of the first power supply relay 121 based on a first post-relay voltage Vpig1.

In the present embodiment, the states of the power supply relays 121 and 221 are monitored based on the post-relay voltages Vpig1 and Vpig2 instead of the power supply relay drive signals Vrd1 and Vrd2. The abnormality monitoring process is the same as the above embodiment except that the threshold value relating to the abnormality determination is different, and may be any of the processing of the first embodiment to the third embodiment. The same applies to the fifth embodiment.

According to the present embodiment, the power supply relay information is the post-relay voltages Vpig1 and Vpig2, which are voltages between the power supply relays 121 and 221 and the inverter circuits 120 and 220. The post-relay voltages Vpig1 and Vpig2 are monitored, thereby being capable of more directly monitoring the states of the systems L1 and L2. In addition, the same effects as those of the embodiment described above can be obtained.

Fifth Embodiment

Figure 13:
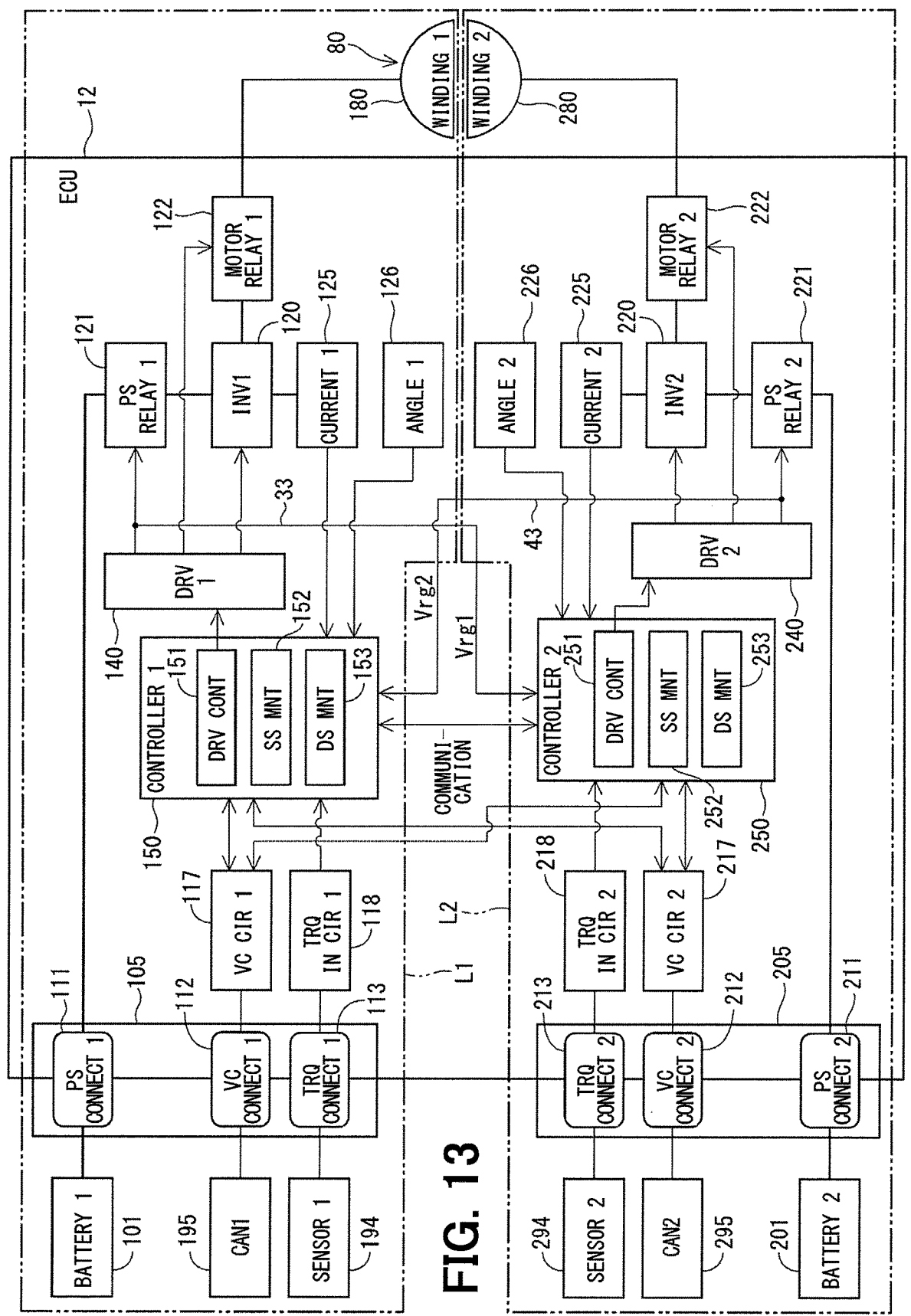
FIG. 13 is a block diagram showing a motor control device according to a fifth embodiment.

FIG. 13 shows a fifth embodiment. In the motor control device 12 according to the present embodiment, the different system monitor 153 acquires a second power supply relay gate signal Vrg2 output from the second driver circuit 240 to the second power supply relay 221 through the signal line 43, and monitors a state of the second power supply relay 221 based on the second power supply relay gate signal Vrg2.

The different system monitor 253 acquires a first power supply relay gate signal Vrg1 output from the first driver circuit 140 to the first power supply relay 121 through the signal line 33, and monitors a state of the first power supply relay 121 based on the first power supply relay gate signal Vrg1. In other words, according to the present embodiment, the states of the power supply relays 121 and 221 are monitored based on the power supply relay gate signals Vrg1 and Vrg2 instead of the power supply relay drive signals Vrd1 and Vrd2.

The first driver circuit 140 is provided between the first controller 150 and the first power supply relay 121. The second driver circuit 240 is provided between the second controller 250 and the second power supply relay 221. The power supply relay information according to the present embodiment is the power supply relay gate signals Vrg1 and Vrg2 output from the driver circuits 140 and 240. The configuration described above also achieves the same effects as those of the embodiments described above.

Other Embodiments

In the embodiments described above, the abnormality of the different system is monitored based on the power supply relay information and the information acquired by the inter-microcomputer communication. In another embodiment, different systems may be monitored based on power supply relay information without using information on the inter-microcomputer communication. According to the first embodiment, when the inter-microcomputer communication is abnormal and the power supply relay information is abnormal, it is determined that the different system drive is stopped. In another embodiment, when the inter-microcomputer communication is abnormal or the power supply relay information is abnormal, it may be determined that the different system drive is stopped.

In the embodiments described above, two winding sets, two drive circuits, and two controllers are provided, which configure two systems. In another embodiment, three or more winding sets, drive circuits, and controllers may be provided, and three or more systems may be provided. In addition, multiple components of each system may be provided in such a manner that multiple controllers are provided in one system, or multiple drive circuits and multiple winding sets are provided in one controller.

In the embodiments described above, the rotary electric machine is a three-phase brushless motor. In another embodiment, the rotary electric machine is not limited to the brushless motor, but may be any motor. The rotary electric machine is not limited to the motor, and may be a generator, or may be a so-called motor generator having the functions of an electric motor and a generator. In the embodiments described above, the rotary electric machine control device is applied to the electric power steering device. In other embodiments, the rotary electric machine control device may be applied to another device other than the electric power steering device. As described above, the present disclosure is not limited to the embodiments described above, and can be implemented in various forms without departing from the spirit of the present disclosure.

The present disclosure has been described in accordance with the embodiments. However, the present disclosure is not limited to such embodiments and structures. The present disclosure also encompasses various modifications and variations within the scope of equivalents. Also, various combinations and forms, as well as other combinations and forms that include only one element, more, or less, are within the scope and spirit of the present disclosure.

What is claimed is:

1. A rotary electric machine control device for controlling a rotary electric machine having a plurality of winding sets, the rotary electric machine control device comprising:
    a plurality of inverter circuits provided correspondingly to the respective winding sets;
    a plurality of power supply relays provided for respective systems when combinations of the winding sets and configurations provided correspondingly to the winding sets are defined as systems, each of the power supply relays capable of switching conduction and non-conduction between a battery and the inverter circuit in a subject system that is one of the systems for which each of the power supply relays is provided; and
    a plurality of controllers provided for the respective systems, each of the controllers including a drive controller, a subject system monitor, and a different system monitor, the drive controller configured to control the inverter circuit and the power supply relay in the subject system, the subject system monitor configured to monitor an abnormality of the subject system, the different system monitor configured to monitor an abnormality of a different system that is one of the systems different from the subject system, wherein
    the drive controller is configured to turn off the power supply relay in the subject system when an abnormality requiring a power supply stop occurs in the subject system,
    the controllers are capable of transmitting and receiving information to and from each other by communication through a communication path, the different system monitor is configured to directly acquire power supply relay information related to a state of the power supply relay in the different system through a signal line different from the communication path and is configured to monitor the abnormality of the different system based on the power supply relay information, the different system monitor is further configured to monitor the abnormality of the different system based on the information acquired from the controller in the different system by the communication and the power supply relay information acquired directly from the different system, and the different system monitor is further configured to:

monitor the abnormality of the different system based on information acquired from the controller of the different system by the communication in a normal state; and monitor the abnormality in the different system based on the power supply relay information acquired through the signal line when a communication disruption occurs.

2. The rotary electric machine control device according to claim 1, wherein the different system monitor is further configured to determine the abnormality of the power supply relay of the different system based on the power supply relay information by an initial check at a time of activation.

3. The rotary electric machine control device according to claim 1, wherein the drive controller is further configured to shift to a backup control when the abnormality of the different system is detected.

4. The rotary electric machine control device according to claim 1, wherein the power supply relay information is a relay drive signal output from each of the controllers.

5. The rotary electric machine control device according to claim 1, further comprising a driver circuit provided between the controller and the power supply relay in each of the systems, and the power supply relay information is a power supply relay gate signal output from the driver circuit.

6. The rotary electric machine control device according to claim 1, wherein each of the controllers change control in accordance with an abnormality monitoring result by the different system monitor.

7. The rotary electric machine control device according to claim 1, wherein the different system monitor is further configured to determine the abnormality of the power supply relay of the different system based on the power supply relay information by an initial check at a time of activation.

8. The rotary electric machine control device according to claim 7, wherein each of the controllers includes a processor and a memory storing a program, and the drive controller, the subject system monitor, and the different system monitor are realized by the processor that executes the program stored in the memory.

9. The rotary electric machine control device according to claim 7, wherein each of the drive controller, the subject system monitor, and the different system monitor is realized by an electronic circuit.

10. The rotary electric machine control device according to claim 1, wherein each of the controllers includes a processor and a memory storing a program, and the drive controller, the subject system monitor, and the different system monitor are realized by the processor that executes the program stored in the memory.

11. The rotary electric machine control device according to claim 1, wherein each of the drive controller, the subject system monitor, and the different system monitor is realized by an electronic circuit.

12. A rotary electric machine control device for controlling a rotary electric machine having a plurality of winding sets, the rotary electric machine control device comprising:

a plurality of inverter circuits provided correspondingly to the respective winding sets;

a plurality of power supply relays provided for respective systems when combinations of the winding sets and configurations provided correspondingly to the winding sets are defined as systems, each of the power supply relays capable of switching conduction and non-conduction between a battery and the inverter circuit in a subject system that is one of the systems for which each of the power supply relays is provided; and a plurality of controllers provided for the respective systems, each of the controllers including a drive controller, a subject system monitor, and a different system monitor, the drive controller configured to control the inverter circuit and the power supply relay in the subject system, the subject system monitor configured to monitor an abnormality of the subject system, the different system monitor configured to monitor an abnormality of a different system that is one of the systems different from the subject system, wherein the drive controller is configured to turn off the power supply relay in the subject system when an abnormality requiring a power supply stop occurs in the subject system, the controllers are capable of transmitting and receiving information to and from each other by communication through a communication path, the different system monitor is configured to directly acquire power supply relay information related to a state of the power supply relay in the different system through a signal line different from the communication path and is configured to monitor the abnormality of the different system based on the power supply relay information, the different system monitor is further configured to monitor the abnormality of the different system based on the information acquired from the controller in the different system by the communication and the power supply relay information acquired directly from the different system, and the different system monitor is further configured to determine that the abnormality occurs in the different system when the power supply relay information is abnormal and a communication abnormality occurs.

13. A rotary electric machine control device for controlling a rotary electric machine having a plurality of winding sets, the rotary electric machine control device comprising:

a plurality of inverter circuits provided correspondingly to the respective winding sets;

a plurality of power supply relays provided for respective systems when combinations of the winding sets and configurations provided correspondingly to the winding sets are defined as systems, each of the power supply relays capable of switching conduction and non-conduction between a battery and the inverter circuit in a subject system that is one of the systems for which each of the power supply relays is provided; and a plurality of controllers provided for the respective systems, each of the controllers including a drive controller, a subject system monitor, and a different system monitor, the drive controller configured to control the inverter circuit and the power supply relay in the subject system, the subject system monitor configured to monitor an abnormality of the subject system, the different system monitor configured to monitor an abnormality of a different system that is one of the systems different from the subject system, wherein the drive controller is configured to turn off the power supply relay in the subject system when an abnormality requiring a power supply stop occurs in the subject system, the controllers are capable of transmitting and receiving information to and from each other by communication through a communication path, the different system monitor is configured to directly acquire power supply relay information related to a state of the power supply relay in the different system through a signal line different from the communication path and is configured to monitor the abnormality of the different system based on the power supply relay information, and the power supply relay information is a post-relay voltage which is a voltage between the power supply relay and the inverter circuit.

* * * * *